United States Patent [19]
Gatto et al.

[11] Patent Number: 5,726,763
[45] Date of Patent: Mar. 10, 1998

[54] DEVICE FOR ANALYSING INFORMATION CARRIERS, ESPECIALLY GAMING TICKETS

[75] Inventors: Jean-Marie Gatto; Dominique Bertrand, both of Paris, France

[73] Assignee: Internationale Des Jeux, Boulogne-Billancourt Cedex, France

[21] Appl. No.: 535,272

[22] PCT Filed: Feb. 6, 1995

[86] PCT No.: PCT/FR95/00141

§ 371 Date: Feb. 6, 1995

§ 102(e) Date: Feb. 6, 1995

[87] PCT Pub. No.: WO95/22120

PCT Pub. Date: Aug. 17, 1995

[30] Foreign Application Priority Data

Feb. 8, 1994 [FR] France ................... 94 01415

[51] Int. Cl.[6] ...................................... H04N 1/00
[52] U.S. Cl. ............................ 358/401; 235/454
[58] Field of Search ...................... 235/454; 358/401

[56] References Cited

U.S. PATENT DOCUMENTS 4,251,153  2/1981  Levine ........................... 358/401

FOREIGN PATENT DOCUMENTS 2141130  1/1973  France.
2160447  6/1973  France.
2 661 529  10/1991  France.

*Primary Examiner*—Harold Pitts
*Attorney, Agent, or Firm*—Young & Thompson

[57] ABSTRACT

An analyzer for reading an information carrying document includes a document drive roller for driving the document into a location to be read, an image detector for reading the document, a case for the image detector which has an opening toward the document drive roller and wheels and pads for applying the document against the document drive roller. The case is angularly movable relative to the document drive roller between a document reading position at which the wheels and pads are applied against the document drive roller, and a document inlet position in which the pads are not applied against the document drive roller. The analyzer may also include at least one finger adjacent the case for at least partially closing the opening when the case is in the document inlet position so as to prevent passage of light through the opening, and for being retracted from the opening when the case is in the document reading position to permit passage of light through the openings so the document can be read.

14 Claims, 3 Drawing Sheets

DEVICE FOR ANALYSING INFORMATION CARRIERS, ESPECIALLY GAMING TICKETS

BACKGROUND OF THE INVENTION

The present invention relates to devices for analysing information carriers, especially gaming tickets or receipts, generally used in gaming input terminals, especially for lottery games, the terminals formulating coded signals transmitted to a central unit in which the bets of the players are stored in memory until the draw.

Such analysers comprise means for inserting information carriers generally consisting of a document drive roller which is itself driven by an electric stepper motor or the like, and means for reading the information on the carrier which convert this information into signals capable of being converted into digital data and transmitted to the central gaming management unit for example.

Among the known information-reading means, mention may be made of image detectors comprising, in a case of elongate shape, a light source intended to illuminate, through a transparent wall of the said case, the document to be read and a series of photosensitive detectors placed in a row in the return path of the light from the source reflected by the document and passing through the transparent wall of the case of the image detector.

The transparent wall is generally held applied against the document drive roller so as to enable the information carriers, such as gaming tickets or receipts, to be driven by the roller in contact with the transparent wall and thus to enable the information carried by the carriers to be read.

Although such an arrangement often gives excellent results, the roller has, however, the drawback of being exposed to the risk of becoming frequently fouled, since the analysers are generally used in places where the image detector is exposed to the risk of picking up dust, traces of ink or eraser residues resulting, for example, from alteration of gaming tickets by the player at the last moment, when inserting his ticket into the analyser.

As a result, the image detector must be frequently removed in order to clean its transparent surface, which leads to periods when the apparatus is out of action and to operations which the official responsible for recording the gaming tickets is not always capable of carrying out under the correct conditions.

SUMMARY OF THE INVENTION

The invention therefore aims to remedy this drawback by creating a device for analyzing information carriers or documents which is virtually never subject to the problems of fouling of the light path between the light source and the photosensitive detectors of its image detector while at the same time preventing the document from coming into contact with the image detector at the point of impact of the light from the light source.

The subject of the invention is therefore a device for analysing information carriers, especially gaming tickets or receipts, comprising a document drive roller and an image detector intended to interact with the drive roller in order to read the information carried by the documents driven by the said roller, the image detector comprising a light source for illuminating the documents and photosensitive elements, arranged in a row, for reading the information contained in the light emitted by the source and reflected by an analysed document, characterized in that the case of the image detector is open on its face turned towards the drive roller and includes means for applying the documents against the roller and in that it is mounted so that it can move angularly with respect to the roller alternately between a document read position applied against the roller and a document inlet position away from the roller.

BRIEF DESCRIPTION OF THE DRAWINGS

The invention will be better understood on reading the following description, given solely by way of example and written with reference to the appended drawings, in which.

DESCRIPTION OF THE PREFERRED EMBODIMENT

Figure 1:
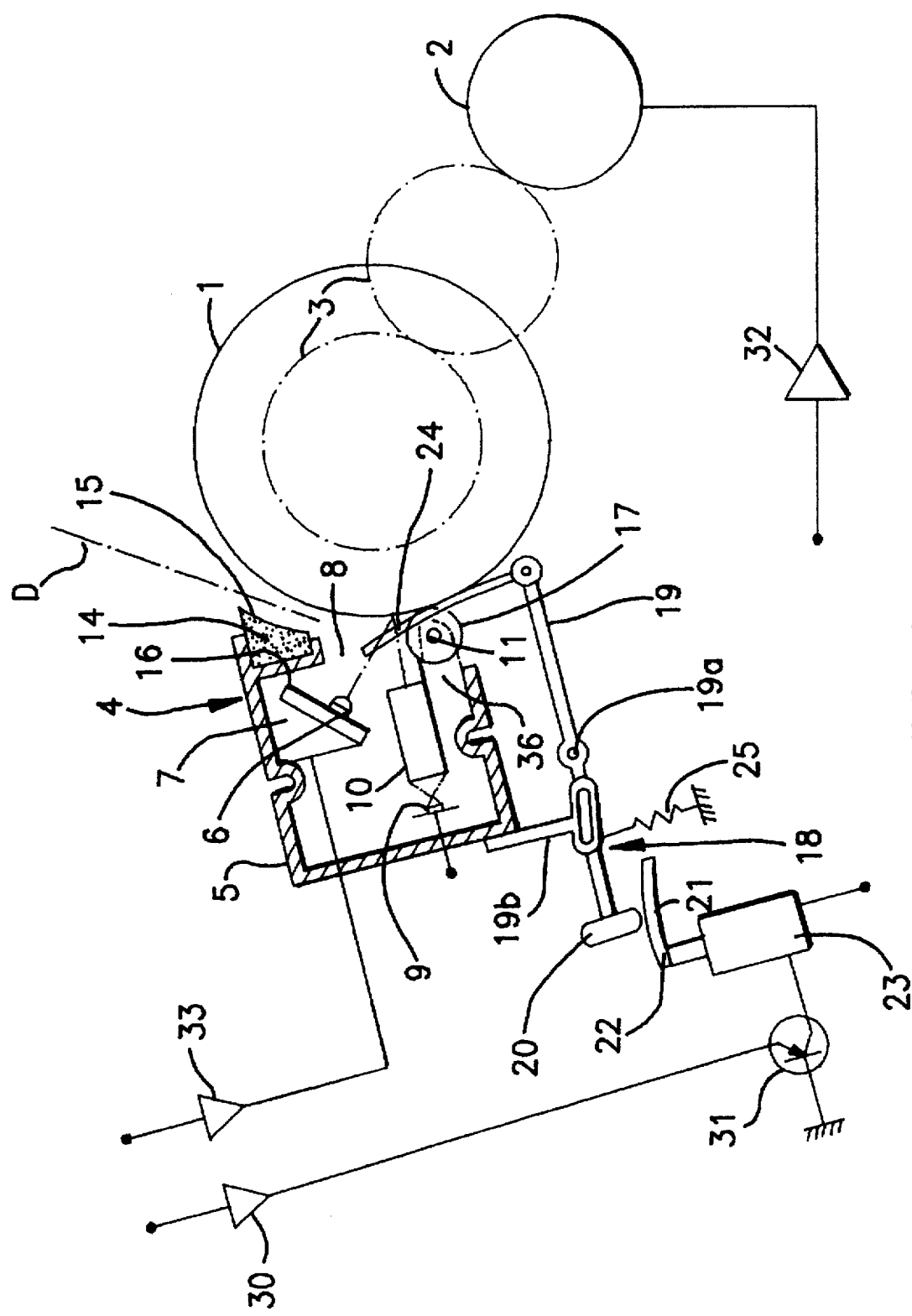
FIG. 1 is a diagrammatic view of the document analyser, according to the invention, with the image detector in the document inlet position.

FIG. 1 shows very diagrammatically a device for analyzing information carriers, especially documents, such as gaming tickets or receipts, comprising a document drive roller 1 driven in rotation by an electric stepper motor 2 via a reduction-gear system 3.

Associated with the driver roller 1 is an image detector 4 which includes, in a case 5 of elongate parallelepipedal general shape, a light source 6 consisting, for example, of a row of light-emitting diodes, the number of which depends on the horizontal resolution and the light intensity required, the said source being placed in a position inclined with respect to the mid-plane of the case 5 and attached to a support 7 fastened to this case.

The rays emitted by the source 6 are directed to an open face 8 of the case towards the documents D to be read which are presented to the device and the rays reflected by a document D are directed to photosensitive elements 9 via light conductors 10 for transmitting light beams to the said photosensitive elements 9. The case 5 of the image detector 4 is mounted so that it can move angularly with respect to the document drive roller 1 about a fixed pivot pin 11.

Provided along a first side of the case 5 is a pad 14, for example made of foam, of roughly prismatic shape, one face 15 of which, turned towards the roller 1, has a shape complementary to that of the roller. The pad 14 is mounted in a groove 16 provided in the corresponding edge of the case 5 above the support 7 for the light source 6.

On its side opposite that having the pad 14, the case 5 of the image detector 4 has wheels 17 which are mounted on the fixed pivot pin 11 of the ease 5 and are intended to interact with the drive roller 1 in order to drive the documents D and to apply them against the roller 1.

The pad 14 itself contributes to the application by pressing the documents D against the roller 1 when the image detector 4 is in the read position, that is to say in the position applied against the roller 1.

In addition, this pressure produces a perfectly uniform surface even if the inserted document has planarity defects such as folds, crumpled regions or the like.

Figure 1A:
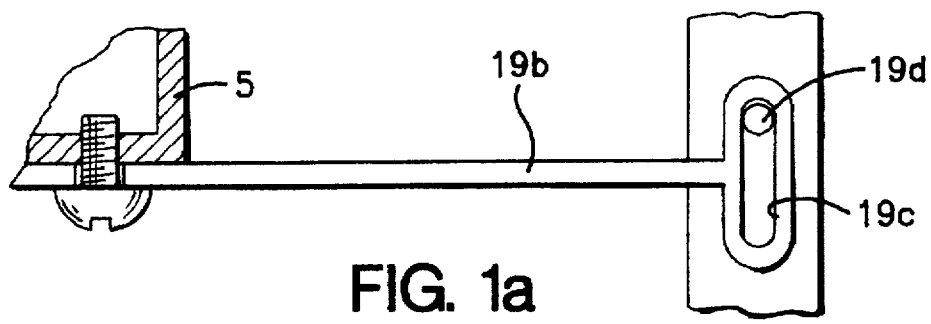
FIG. 1a is a partial view on a larger scale showing a detail of the device of FIG. 1.

The case 5 of the image detector 4 can move, between its read position applied against the roller 1 and its inlet position away from the latter, by means of a mechanism 18 comprising a lever 19 mounted so as to swing about a fixed pin 19a and connected to the case 5 via a link rod 19b pivoted on the lever 19 via a slot 19c which interacts with a finger 19d carried by the lever 19, as shown in FIG. 1a. At one end, the lever 19 includes a cam follower 20 which interacts with a cam surface 21 carried by the end of the plunger core 22 of an electromagnet 23 for controlling the movement of the lever 19.

At its opposite end, the lever 19 has fingers 24 for orientating the documents D presented to the read device when the image detector is in the position away from the drive roller 1, the fingers 24 being retractable when the image detector is in the read position applied against the roller 1.

Associated with the lever 19 is a spring 25 for returning fingers 24 to the pushed-in position.

The actuating electromagnet 23 is controlled at the rate of passage of the documents D presented to the device, on the basis of control signals which are generated by control means (not shown) and which are transmitted to the electromagnet 23 via an amplifier 30 and a power transistor 31, and moves the image detector 4, about the fixed pin 11, alternately between the document read position applied against the roller 1 and the document inlet position away from the roller 1.

Likewise, the electric motor 2 is controlled by signals which are themselves generated by control means, not shown, and transmitted to the said motor via an amplifier 32, and the light source 6 receives control signals via an amplifier 33.

In FIG. 1, the device is shown in the rest position, for the reception or inlet of a document D. In this position, the pad 14 of the image detector 4 is away from the roller 1 and thus provides an entry for the document D, while the fingers 24 fastened to the lever 19 are engaged in gaps between the wheels 17 and thus guide the documents D which are presented in the gap between the pad 14 and the roller 1.

It may be Been that the fingers 24 have a slightly curved shape in order to guide effectively.

Figure 2:
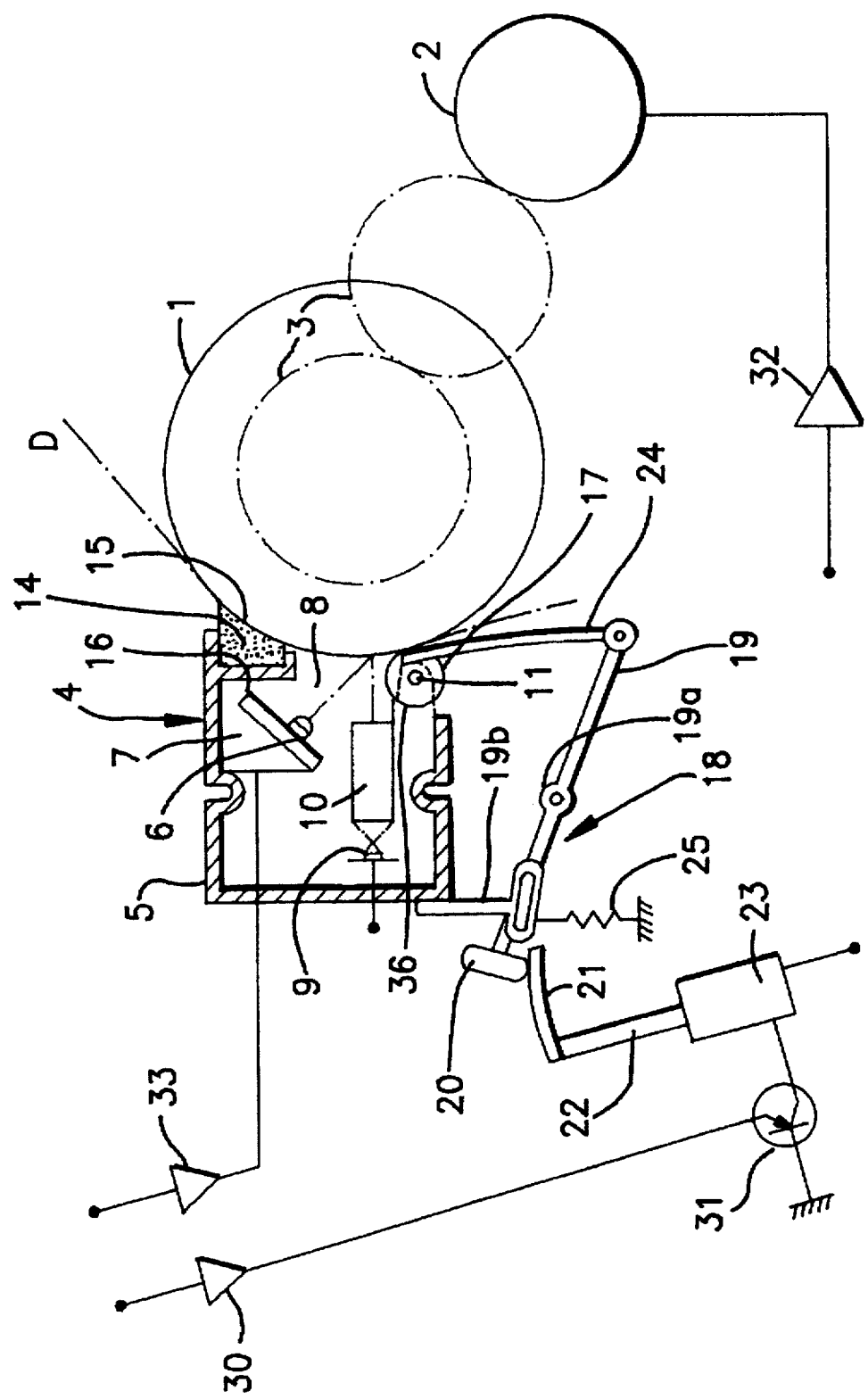
FIG. 2 is a view similar to that of FIG. 1 of the device according to the invention in the document read position.

When a document D is engaged between the pad 14 of the image detector and the roller 1, the electromagnet 23 receives a closure control signal and its plunger 22, during its translational movement, pushes the cam follower 20 and moves the lever 19 angularly about the pin 19a towards its position shown in FIG. 2.

This angular movement of the lever 19 also leads to the angular movement of the case 5 of the image detector 4 about the fixed pin ti so as to make it occupy the read position shown in FIG. 2, in which the pad 14 may be seen applied against the roller 1 and the wheels 17 contribute to the application and to the pressure of the document D against the roller 1.

Furthermore, the guide fingers 24, being in a retracted position, are no obstacle to the propagation of the light rays emitted by the source 6, so that these may be reflected by the document D and sent to the photosensitive elements 9 via the light conductors 10.

There is therefore no obstacle in the path of the light, such as a transparent wall which would be liable to be subject to any sort of fouling because of dust penetration or splashing of ink drops on such a transparent surface.

Furthermore, by virtue of the arrangement of the invention, the image detector which, through the action of the electromagnet 23, is alternately in the read position applied against the drive roller 1 and the document inlet position away from this roller, may be subjected to cleaning and checking operations without having to carry out the slightest dismantling operation.

Figure 3:
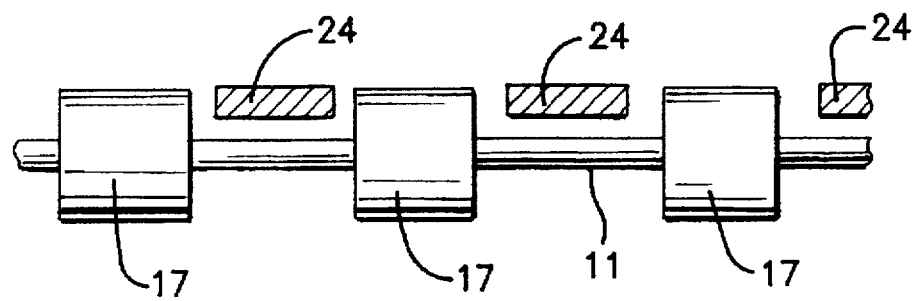
FIG. 3 is a partial side view showing a detail of the device represented in FIG. 2.

Thus, as may be seen in more detail in FIG. 3, the wheels 17 carried by one of the edges of the case 5 of the image detector 4 are mounted on the longitudinal pin 11 supported by lugs 36, seen in FIG. 2, these lugs being fastened to the end walls of the case 5 and arranged at regular intervals so as to allow the guide fingers 24 carried by the lever 19 to pass.

Figure 4:
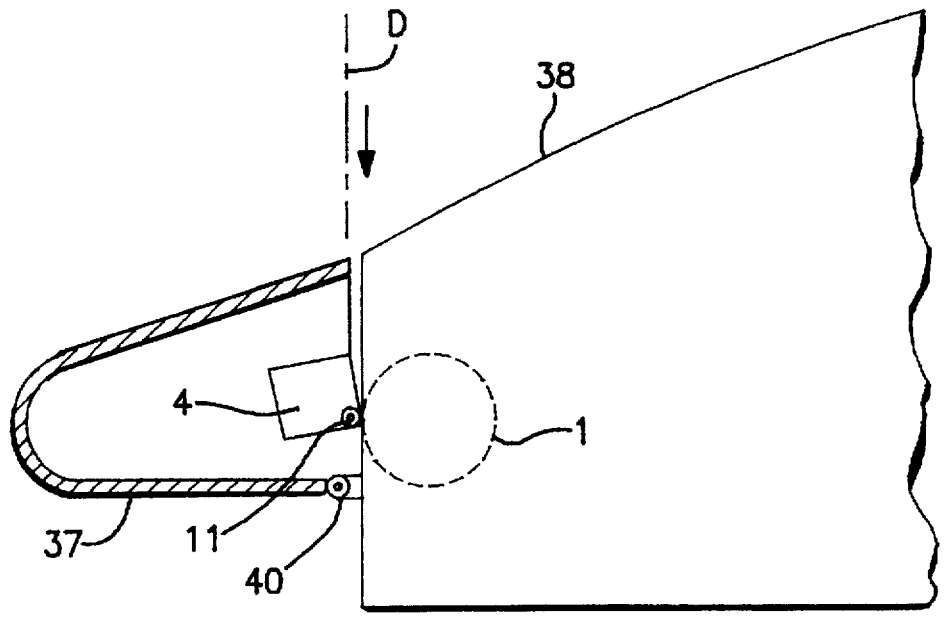
FIG. 4 is a diagrammatic partial sectional view showing the arrangement of the image detector and of the document drive roller of the device according to the invention in a gaming input terminal.

In addition, advantageously and as shown diagrammatically in FIG. 4, the image detector 4 is mounted in a cover 37 pivoted to the rest of the case 38 of a gaming terminal, for example, and with the latter defines a slot 39 for inserting the documents D to be examined.

The cover 37 is articulated to the case 38 by means of a pin 40 and, when it is opened, provides access to the entire mechanism of the analyser according to the invention.

It may therefore be seen that, by virtue of the arrangement which has just been described, a device is obtained for analysing information carriers, especially gaming tickets or receipts, which operates reliably and is not subject to fouling due to the presence of transparent walls requiring periodic cleaning.

Moreover, access to the device according to the invention is extremely easy in order to clean it and to repair its component parts.

We claim:

1. An analyzer for reading an information carrying document, comprising:

a document drive roller for driving the document into a location to be read;

an image detector for reading the document driven into the location by said document drive roller, said image detector comprising a light source for illuminating the document and at least one photosensitive element for reading the illuminated light which has been reflected from the document; and a case for said image detector, said case comprising an opening toward said document drive roller, means for applying the document against said document drive roller, and wherein said case is angularly movable relative to said document drive roller between a document reading position at which said means is applied against said document driver roller and a document inlet position at which said means is not applied against said document drive roller.

2. The analyzer of claim 1, wherein said means for applying comprises at least one pad carried by an exterior side of said case, and wherein said case further comprises at least one wheel at said exterior side for applying the document against said document drive roller.

3. The analyzer of claim 2, wherein said pad has a surface facing said document drive roller which has a shape complementary to said document drive roller, and wherein said wheel is carried by a fixed longitudinal pin through said case.

4. The analyzer of claim 3, wherein said case is mounted on said fixed longitudinal pin so as to be angularly movable between the document reading position and the document inlet position, and further comprising driving means for moving said case.

5. The analyzer of claim 4, wherein said driving means comprises, a lever pivotable about a further fixed pin and which has a finger extending therefrom, an end of said lever having a cam follower, a resilient bias member connected to said lever for returning said case to the document inlet position, a link rod having one end connected to said case and at its other end having a slot for movably carrying said finger, and an actuating electromagnet having a movable plunger core for interacting with said cam follower, whereby actuation of said electromagnet moves said case to the document reading position.

6. The analyzer of claim 5, wherein said lever carries at least one finger at an end opposite said cam follower, said finger for guiding the document and for at least partially closing said opening when said case is in the document inlet position, said finger also for being retracted from said opening when said case is in the document reading position.

7. The analyzer of claim 1, further comprising a hinged cover for enclosing said case and for defining a slot for insertion of the document.

8. The analyzer of claim 1, further comprising at least one finger adjacent said case for at least partially closing said opening when said case is in the document inlet position, said fingers also for being retracted from said opening when said case is in the document reading position.

9. The analyzer of claim 1, wherein said case further comprises plural, spaced-apart wheels at a an exterior side of said case for applying the document against said document drive roller, and wherein the analyzer further comprises plural fingers, each between a pair of said spaced-apart wheels for helping to guide the document into the location.

10. The analyzer of claim 9, wherein said wheels are mounted on a fixed axle about which said case moves, and wherein said fingers are hinged on a lever which pivots about a fixed pin, both said lever and said case being moved by actuation of a single plunger.

11. An analyzer for reading an information carrying document, comprising:

a document drive roller for driving the document into a location to be read;

an image detector for reading the document driven into the location by said document drive roller, said image detector comprising a light source for illuminating the document and at least one photosensitive element for reading the illuminated light which has been reflected from the document;

a case for said image detector, said case comprising an opening facing the location for passage of the illuminated and reflected light, wherein said case is angularly movable relative to said document drive roller between a document reading position and a document inlet position; and at least one finger adjacent said case for at least partially closing said opening when said case is in the document inlet position so as prevent passage of light through said opening, said finger also for being retracted from said opening when said case is in the document reading position to permit passage of light through said opening.

12. The analyzer of claim 11, wherein said case further comprises plural, spaced-apart wheels at a an exterior side of said case for applying the document against said document drive roller, and wherein the analyzer comprises plural ones of said finger, each said finger being between a pair of said spaced-apart wheels for helping to guide the document into the location.

13. The analyzer of claim 12, wherein said wheels are mounted on a fixed axle about which said case moves, and wherein said fingers are hinged on a lever which pivots about a further fixed pin, both said lever and said case being moved by actuation of a single plunger.

14. The analyzer of claim 11, wherein said case further comprises at least one pad carried by an exterior side of said case for applying the document against said document drive roller, and wherein said pad is immediately adjacent said document drive roller in the document reading position and spaced from said document drive roller in the document inlet position.

* * * * *